United States Patent [19]
Hwang

[11] Patent Number: 5,184,253
[45] Date of Patent: Feb. 2, 1993

[54] FIBER OPTIC ILLUMINATOR DISPLAY

[76] Inventor: Steven Hwang, 4F, No. 6-6, Alley 11, Lane 147, Sec. 3, Hsin Yi Rd., Taipei, Taiwan

[21] Appl. No.: 808,887

[22] Filed: Dec. 18, 1991

[51] Int. Cl.$^5$ .............................................. G02B 5/22
[52] U.S. Cl. .................................... 359/889; 359/385; 385/32; 385/116; 362/32
[58] Field of Search ............... 359/889, 503, 891, 894, 359/385, 390; 362/32, 293; 385/31, 32, 115, 116

[56] References Cited

U.S. PATENT DOCUMENTS

| | | | |
|---|---|---|---|
| 4,519,017 | 5/1985 | Daniel | 362/32 |
| 4,786,139 | 11/1988 | Sedlmayr | 362/32 |
| 4,917,448 | 4/1990 | Oppenheimer | 362/32 |
| 5,021,928 | 6/1991 | Daniel | 362/32 |
| 5,036,435 | 7/1991 | Tokuda et al. | 362/32 |

*Primary Examiner*—Loha Ben
*Attorney, Agent, or Firm*—Jacobson, Price, Holman & Stern

[57] ABSTRACT

An optical fiber illuminator display, uses a color filter light source assembly having a color filter cylinder rotated by a motor and a light source to project light through the color filters on the color filter wheel; a display board having patterns formed of holes; and a bunched optical fiber set held by a holder in front of the color filter wheel to transmit color light to the patterns on the display board, and wherein the bunched optical fiber set consists of a plurality of bus wires, the bus wires each being constituted of a plurality of optical fiber filaments arranged in a row, the optical fiber filaments each having one end fastened in the holder and an opposite end respectively inserted in the holes on the display board.

1 Claim, 2 Drawing Sheets

FIBER OPTIC ILLUMINATOR DISPLAY

BACKGROUND OF THE INVENTION

The present invention relates to a fiber optic illuminator display which utilizes optic fibers for illuminating a signboard or the like.

Fiber optic illuminating devices have been widely used in illuminating advertising media. In a fiber optic illuminating device according to the prior art, a bundle of optical fiber filaments (A) (see FIG. 1) is connected between a light source and a display board (B). In this arrangement, it is very difficult to pick up respective optical fiber filaments from the bundle (A) for inserting in respective holes which form patterns on the display board (B). If the optical fiber filaments are not properly inserted in the holes on the display board (B), they may set in a tangle, affecting light transmission quality.

SUMMARY OF THE INVENTION

The present invention has been accomplished to eliminate the aforesaid problem. It is therefore the main object of the present invention to provide a fiber optical illuminator display which is easy to assemble and produces high light transmission quality. According to the present invention, there is provided a fiber optical illuminator display which is generally comprised of a color filter light source assembly, a display board, and a bunched optical fiber set connected between the color filter light source assembly and the display board for transmitting color light to the patterns on the display board. The bunched optical fiber set is comprised of a plurality of bus wires. Each bus wire is comprised of a plurality of optical fiber filaments arranged in a row. The bus wires are attached with one above another or side by side forming into a bunched optical fiber set for fastened between the color filter light source assembly and the display board. Because the optical fiber filaments are arranged in rows, they can be easily picked up in proper order for fastening in the patterns on the display board.

DETAILED DESCRIPTION OF THE PREFERRED EMBODIMENT

Figure 1:
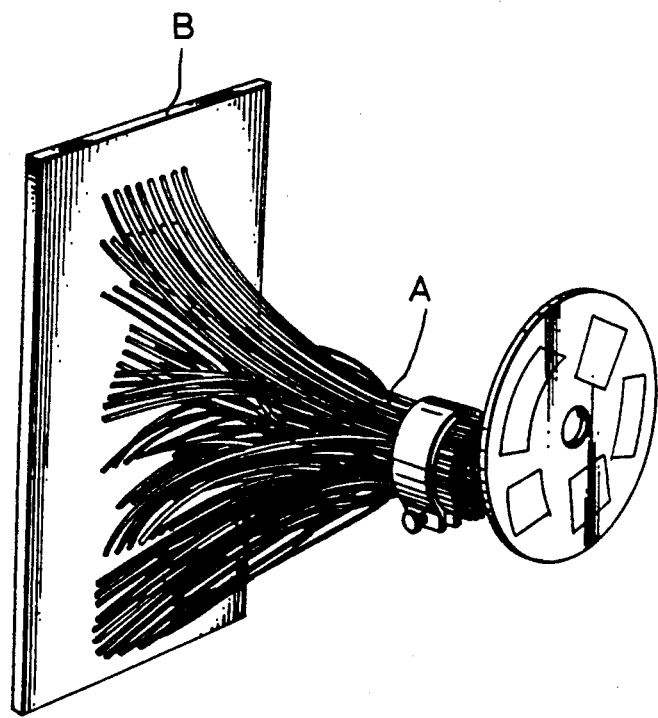
FIG. 1 illustrates the arrangement of optical fiber filaments in a fiber optic illuminator display according to the prior art.
Figure 2:
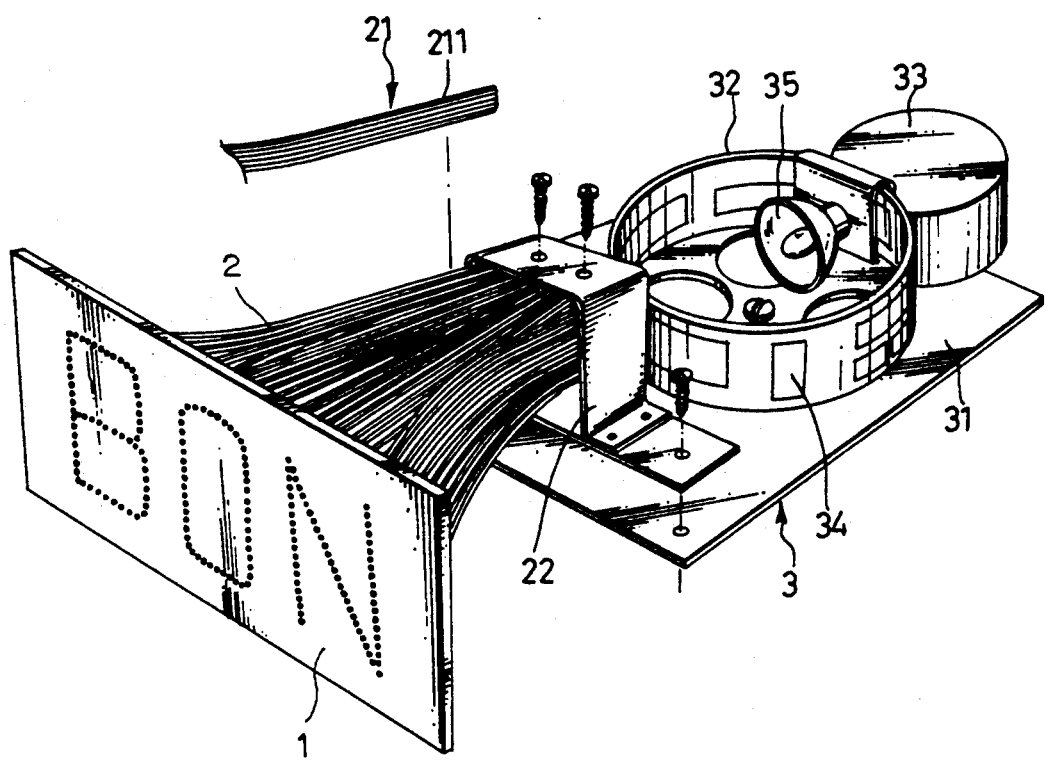
FIG. 2 is a perspective view of a fiber optic illuminator display embodying the present invention.

Referring to FIG. 2, the present invention is generally comprised of a display board 1, a bunched optical fiber set 2, and a color filter light source assembly 3. The bunched optical fiber set 2 which is fastened in a holder 22 is consisted of a plurality of bus wires 21 each of which is consisted of a plurality of optical fiber filaments 211. The free ends of the optical fiber filaments 211 of the bus wires 21 of the bunched optical fiber set 2 are respectively inserted in holes on the display board 1 for showing a pattern or a series of letters. The color filter light source assembly 3 comprises a base board 31 having a color filter cylinder 32 mounted thereon and driven to rotate by a motor 33, and a light source 35 inside the color filter cylinder 32. The color filter cylinder 32 has a variety of color filters 34 around the peripheral face thereof for filtrating the light from the light source 35.

During assembly process, the holder 22 is fastened on the base board 31 in front of the color filter cylinder 32, then, the bus wires 21 of the bunched optical fiber set 2 can be attached with one above another or side by side and fastened in the holder 22 with the free ends of the optical fiber filaments 211 thereof respectively inserted in the holes on the display board 1. When the motor 33 and the light source 35 (which are respectively connected to a power supply and controlled by a power switch) are turned on, colorful light rays are transmitted through the holes on the display board 1 via the optical fiber filaments 211 of the bus wires 21 of the bunched optical fiber set 2.

What is claimed is:

1. A fiber optic illuminator display, comprising:
   a display board having patterns formed by holes;
   a color filter light source assembly, said color filter light source assembly comprising a base board having a color filter cylinder driven to rotate by a motor, said color filter cylinder having a plurality of color filters around the cylinder, a light source on said base board inside said color filter cylinder, and an optical fiber holder on said base board outside said color filter cylinder and in alignment with said light source;
   a bunched optical fiber set connected between said holder and said display board for transmitting light rays from said light source to said patterns via said color filters; and
   characterized in that said bunched optical fiber set is consisted of a plurality of bus wires attached with one above another or side by side, said bus wires each being consisted of a plurality of optical fiber filaments arranged in a row, said optical fiber filaments each having one end fastened in said holder and an opposite end respectively inserted in the holes on said diplay board.

* * * * *